United States Patent [19]

Perego

[11] Patent Number: 4,819,958
[45] Date of Patent: Apr. 11, 1989

[54] CHILD'S FOLDING PUSHCHAIR WITH SAFETY DEVICE FOR LOCKING THE PUSHCHAIR IN THE OPENED POSITION

[75] Inventor: Gianluca Perego, Arcore, Italy
[73] Assignee: Peg Perego Pines SpA, Italy
[21] Appl. No.: 47,901
[22] Filed: May 7, 1987

[30] Foreign Application Priority Data

Oct. 29, 1986 [IT] Italy ............................ 23509/86[U]

[51] Int. Cl.$^4$ ........................ B62B 7/08; B62B 9/00
[52] U.S. Cl. ......................... 280/644; 280/650; 280/658; 297/DIG. 4
[58] Field of Search ............. 280/642, 644, 647, 649, 280/650, 658; 297/DIG. 4

[56] References Cited

U.S. PATENT DOCUMENTS

| | | | |
|---|---|---|---|
| 3,918,734 | 11/1975 | Firth et al. | 280/650 |
| 4,632,421 | 12/1986 | Shamie | 280/658 |
| 4,706,986 | 11/1987 | Kassai | 280/642 |
| 4,741,551 | 5/1988 | Perego | 280/642 |

FOREIGN PATENT DOCUMENTS

2502569  10/1982  France ............................ 280/658

Primary Examiner—David M. Mitchell
Assistant Examiner—Brian L. Johnson
Attorney, Agent, or Firm—McGlew and Tuttle

[57] ABSTRACT

A child's folding pushchair comprises an articulated frame made of tubular metallic elements, featuring a pair of opposed sides provided with respective locking units acting between adjacent tubular elements of the said frame, which locking units can be moved between a first operative position, in which the pushchair is locked in an opened position, and a second inoperative position in which the pushchair can be folded.

With at least one of the said locking units there cooperates a safety device adapted to maintain the said units momentarily in the said second inoperative position, so that the other locking unit can be released and thus enable the pushchair to be folded.

3 Claims, 4 Drawing Sheets

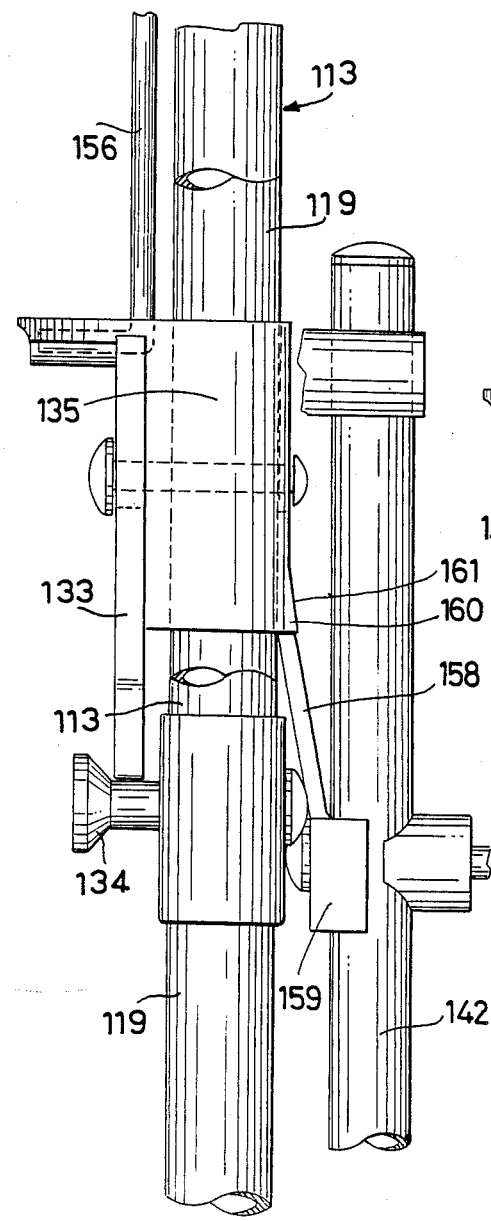
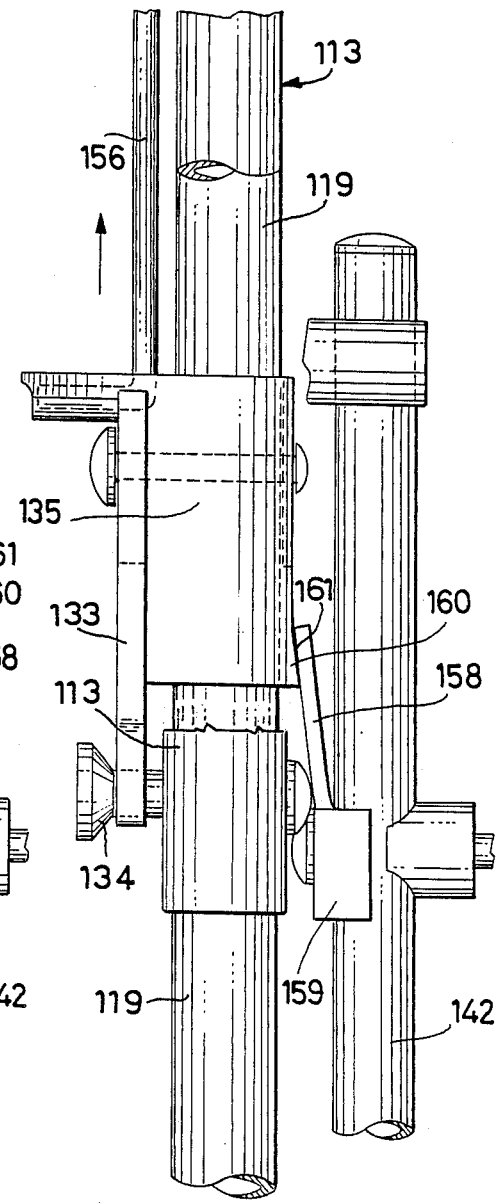

CHILD'S FOLDING PUSHCHAIR WITH SAFETY DEVICE FOR LOCKING THE PUSHCHAIR IN THE OPENED POSITION

The present invention relates to a child's folding pushchair comprising a safety device which maintains the pushchair in the opened position, even if the control for the release of the retaining means which maintain the pushchair positively in the opened position is accidentally operated.

Folding pushchairs are known which are provided on only one of their sides with a locking device adapted to maintain the pushchair in the operatively opened position.

Such locking device consists substantially of a system of coupling between the component parts of the pushchair frame, which system is released, against elastic loading, by a manual operation or also by foot pressure.

Such a known device is for example described and illustrated in Italian Utility Model Appln. No. 21630 B/86 of Apr. 23, 1986 (see cooresponding U.S. Pat. No. 4,741,551) in the name of the same Applicant.

Locking devices of this kind have the disadvantage that they can be released accidentally, in which case the stability of the opened pushchair seating the child is jeopardized.

The general object of the present invention is therefore to embody a safety device by means of which the folding pushchair can only fold when intentionally controlled to do so by the person handling it, thus preventing the pushchair from remaining inadvertently in an unstable opened position, with the child seated in it, as a result of accidental operation of the release control.

To achieve this object the invention embodies a child's folding pushchair of the type comprising an articulated frame made of tubular metal featuring a pair of opposed sides provided with respective locking units which act between adjacent tubular elements of the frame, which locking units are movable between a first operative position, in which the pushchair is locked in the opened condition, and a second inoperative position in which the pushchair can be folded, wherein there cooperate with at least one of said locking units a safety device adapted to maintain the said units momentarily in the said second inoperative position, so tht the other locking unit can be released and thus enable the pushchair to be folded.

The safety device of the invention preferably comprises an elastically yieldable tongue protruding from a tubular element of the frame and adapted to engage, by jibbing against it, a tooth solid with the said locking unit.

The structural and functional characteristics of the invention and its advantages over the known art will become more apparent from an examination of the following description, with reference to the appended drawings which illustrate an example of a locking device based on the innovative principles of the invention.

In the drawings:

FIG. 2 is an enlarged particular of the safety device taken on the arrow F of FIG. 1;

FIG. 4 is a view as in FIG. 2, but taken on the arrow F of FIG. 3, i.e. with the safety device in the released position.

The appended drawings illustrate only partially a folding pushchair to which the safety device of the invention can be applied, since such a pushchair can be of any type known to persons with ordinary skill in the art; such as for example the pushchair forming subject matter of the previously mentioned Italian Application No. 21630 B/86, from which the relevant technology may be better understood.

Figure 1:
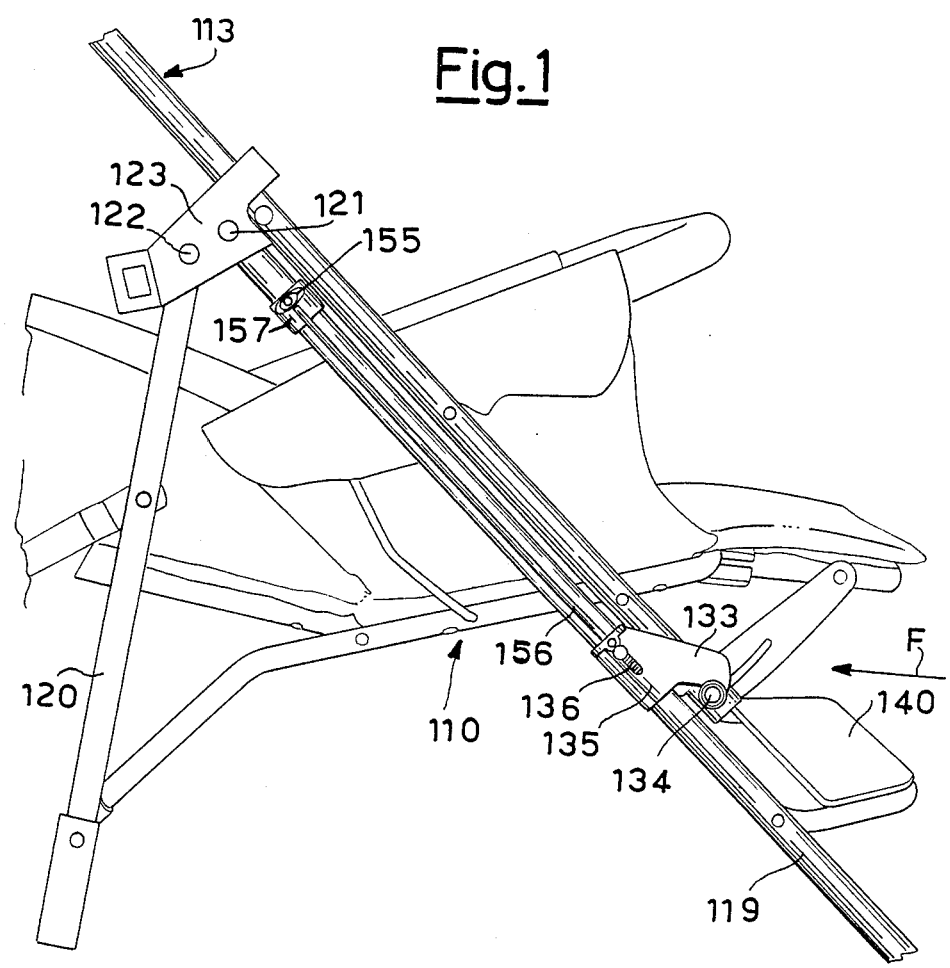
FIG. 1 is a side elevation partly illustrating the side of a child's folding pushchair, comprising a safety device according to the invention, in which the pushchair is locked in the opened, operative position.
Figure 3:
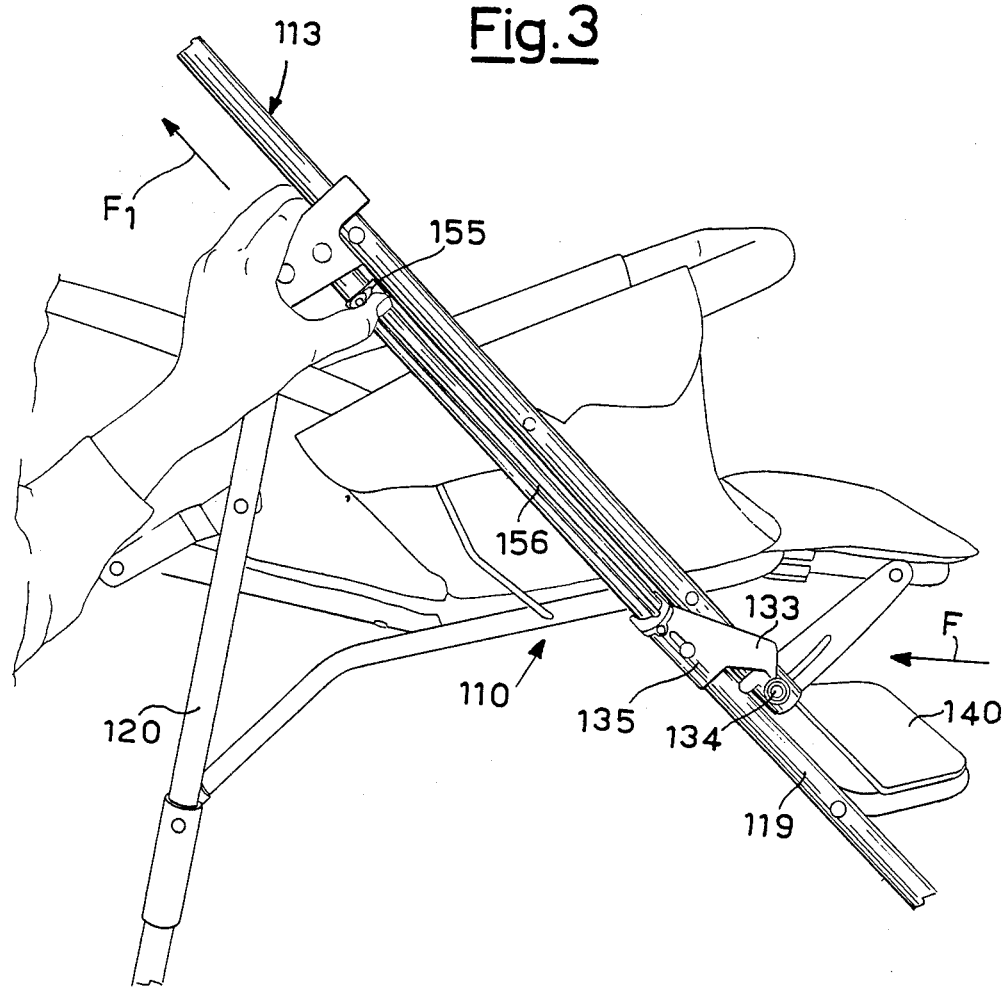
FIG. 3 is a view as in FIG. 1, but illustrating the safety device after it has been brought to the intermediate condition indispensable to enable the subsequent folding of the pushchair.
Figure 5:
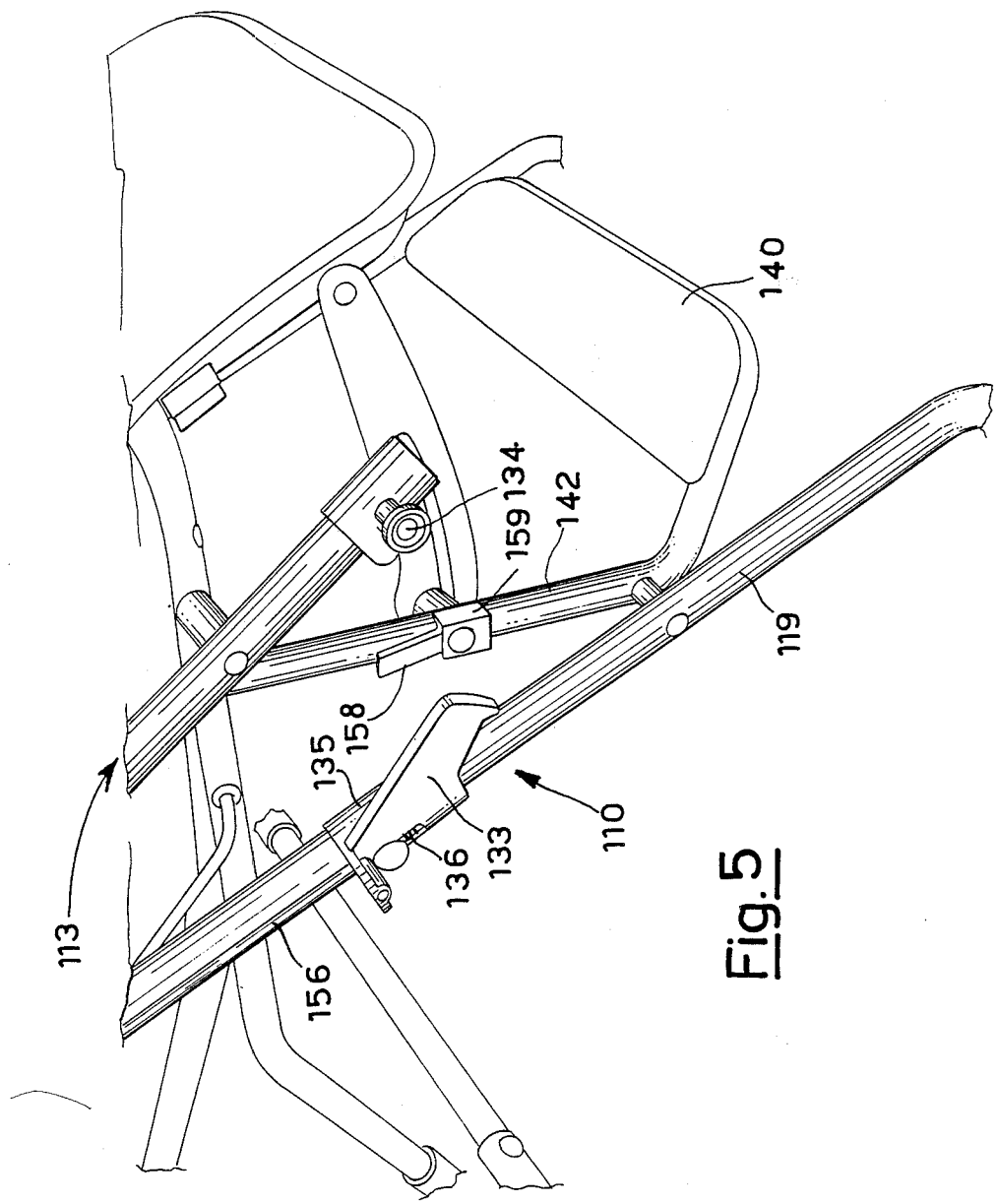
FIG. 5 is a perspective view illustrating the pushchair folding stage.

In FIGS. 1, 3 and 5 of the drawings, the numeral 110 indicates overall a side of the child's folding pushchair comprising a pair of rods 119, 120 which at the lower ends carry pivoting wheels (not shown).

The rods 119 and 120 have respective upper ends secured at a pivot 121 and at a pivot 122 to a knot or plate 123 which is slidingly traversed by the relative side of a handle-bar 113, which is only partially shown.

The stable, opened position of the pushchair is determined, on the lower side only, by the engagement of a pair of hooks 133 (one for each side 110 of the pushchair) with a relative pin 134 protruding radially from the end of the side of the handle-bar 113.

Each of the hooks 133 is solid with a slider 135 sliding on the rod 119 against the action of a spring 136 which tends to maintain the hook 133 engaged with the pin 134. The translation of the slider 135 is controlled manually by means of a small grip 155 connected to the slider 135 through a tie-rod 156.

The grip 155 extends radially from a sleeve 157 translatable on the rod 119.

With particular reference to FIGS. 2, 4 and 5, it can be seen that with only one of the hooks 133 there cooperates a safety device comprising an elastically yieldable tongue 158, for example made of plastics material, extending from a support 159 secured to one of the sides 142 of the "U" shaped member bearing the footrest 140.

A locking tooth 160 protruding from the slider 135, and also featuring an inclined outer wall 161, cooperates with the elastic tongue 158.

To simplify drawings and description, only one side 110 of the folding pushchair has been illustrated, since the opposite side is identical except for the fact that the elastic tongue 158/tooth 160 complex is provided on only one of the two sides 110 of the pushchair.

The safety device, embodied according to the invention operates, as follows: as can be clearly seen from FIGS. 1 and 2, when the hooks 133 are hooked onto the pin 134 the pushchair is in a stable opened position and the tongue 158 rests in an inoperative condition against the inclined outer surface 161 of the tooth 160.

The correct procedure for folding the pushchair is the following: by pulling the grip 155 (on the side 110 of the pushchair provided with the elastic tongue 158/tooth 160 complex) in the direction of the arrow F1, through the intermediary of the tie-rod 156 and the sleeve 135, the person handling the pushchair disengages the hook 133 from the pin 134 at the same time causing, when the grip 155 is released, engagement of the elastic tongue 158 with the tooth 160 of the sleeve 135, as can be clearly seen in FIG. 4.

The person handling the pushchair can now act similarly on the grip 155 on the other side 110 of the pushchair, so as to release also the other hook 133 from the pin 134 and allow the pushchair to be conventionally folded by exerting tractive force on the handle-bar 113.

When the pushchair is opened-up again into the position shown in FIG. 1, owing to the action of the shaped surface 161 the elastic tongue 158 and the tooth 160 will assume the inoperative condition shown in the particular of FIG. 2.

It will thus be seen that, with the safety device according to the invention, any accidental operation of one or other of the two grips 155 can never lead to the accidental folding or collapse of the pushchair.

A tractive force exerted on the grip 155 not provided with the tongue 158/tooth 160 complex will in fact cause a momentary disengagement of the hook 133 from the pin 134, the reciprocal engagement of which will be automatically restored by the action of the spring 136 when the said tractive force is relinquished.

On the other hand, any accidental tractive force brought to bear on the other grip 155 will release solely the safety device, bringing it into the condition illustrated in FIGS. 3 and 4, in which the folding of the pushchair can occur only after a subsequent positive operation on the grip 155 on the other side 110, to cause the disengagement of the other hook 133 from the respective pin 134.

The object mentioned heretofore is thus achieved.

Lastly, it should be noted that the safety device according to the invention has been described with reference to a child's folding pushchair solely by way of a non-limiting example: for the safety device can likewise be applied to carriages with an upper cot structure supported by a folding frame featuring tubular metallic members.

I claim:

1. A child's folding pushchair of the type comprising an articulated frame made of tubular elements, said frame including a pair of opposed sides each having first and second respective locking units acting between adjacent first and second tubular elements, said first and second locking units being movable between a first operative position in which the pushchair is locked in an open position and a second inoperative position in which the pushchair can be folded, at least one locking unit having a safety device maintaining said units temporarily in said inoperative position, said safety device comprising a tooth on said first tubular element and a tongue supported from said second tubular element engageable with said tooth and preventing relative movement between said first and second tubular elements, one of said tubular elements comprising a handle bar of the pushchair, said safety device being releasable by moving said tongue out of engagement with said tooth to thus enable the pushchair to be folded.

2. A child's folding chair comprising an articulated frame having respective sides on each side with adjacent first and second tubular elements, a plate engaged with said first and second tubular elements, one of said tubular elements comprising a handle bar rod slidable in said plate, the other of said tubular elements comprising a second rod having a pivot connection to said plate, a first locking member carried on said second rod, a second locking member carried on said handle bar rod engageable with said first locking member, release means on each side of said frame for separately releasing said first and second locking members separately, a safety device on only one side of said frame, including a tooth element on one of said rods and a locking tongue supported from the other of said rods which is engageable against said tooth member to temporarily hold said first and second tubular elements so that they are in an operative position, one of said release means being effective to open said safety device by moving said tongue out of engagement with said tooth.

3. A child's folding pushchair of the type comprising an articulated frame made of tubular elements, said frame including a pair of opposed sides each having first and second respective locking units acting between adjacent first and second tubular elements, said first and second locking units being movable between a first operative position in which the pushchair is locked in an open position and a second inoperative position in which the pushchair can be folded, at least one locking unit having a safety device maintaining said units temporarily in said inoperative position, said safety device comprising a tooth on said first tubular element and a tongue supported from said second tubular element engageable with said tooth and preventing relative movement between said first and second tubular elements, one of said tubular elements comprising a handle bar of the pushchair, said safety device being releasable by moving said tongue out of engagement with said tooth to thus enable the pushchair to be folded, each of said locking elements can be controlled remotely by means of a grip sliding on a tubular element and connected to said locking unit by a tie rod.

* * * * *